April 8, 1952 B. E. GETZ 2,592,270
METHOD OF PROCESSING HAY AND THE LIKE
Original Filed July 26, 1949 5 Sheets-Sheet 1

Inventor:
Benjamin E. Getz

April 8, 1952 B. E. GETZ 2,592,270
METHOD OF PROCESSING HAY AND THE LIKE
Original Filed July 26, 1949 5 Sheets-Sheet 2
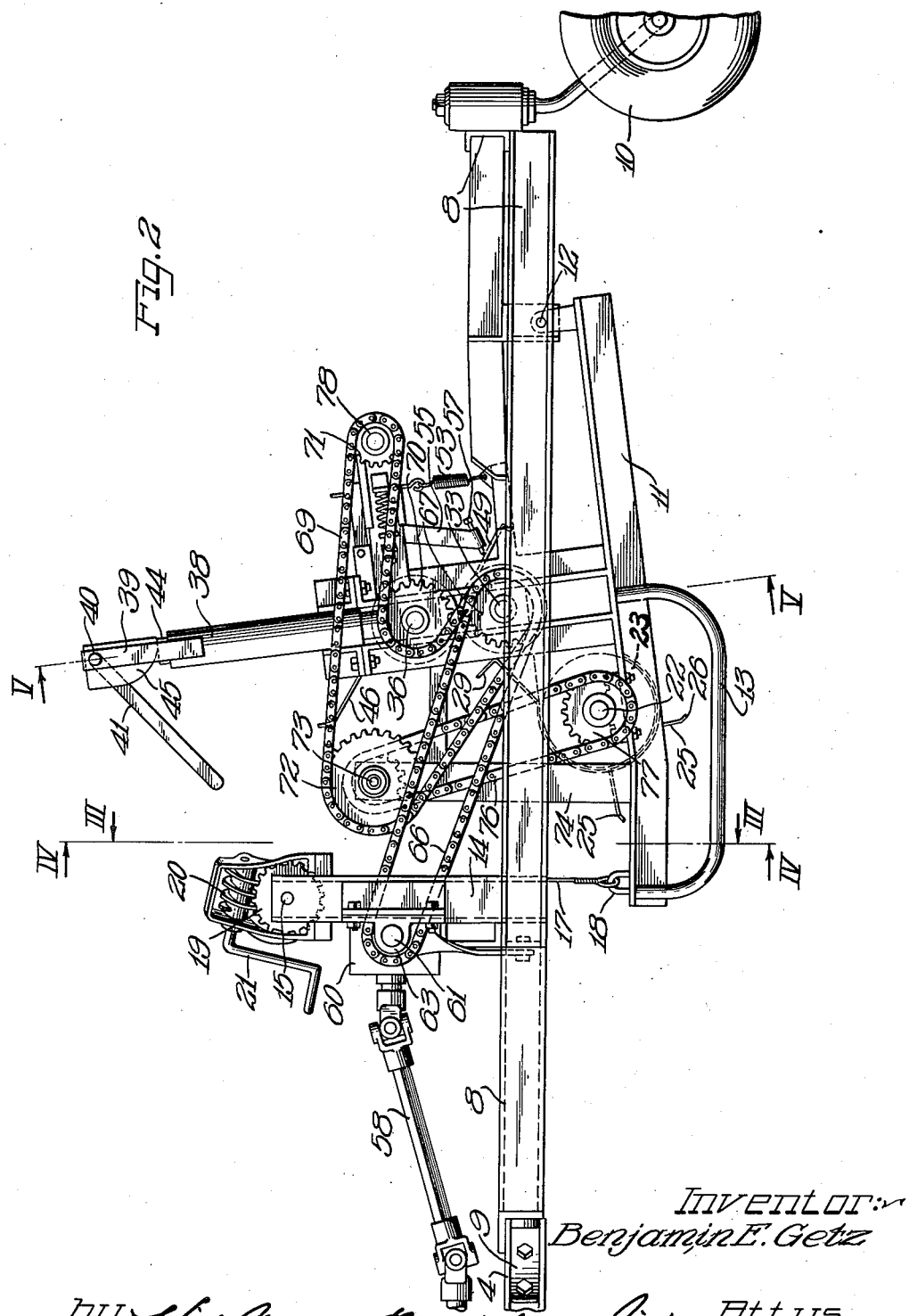

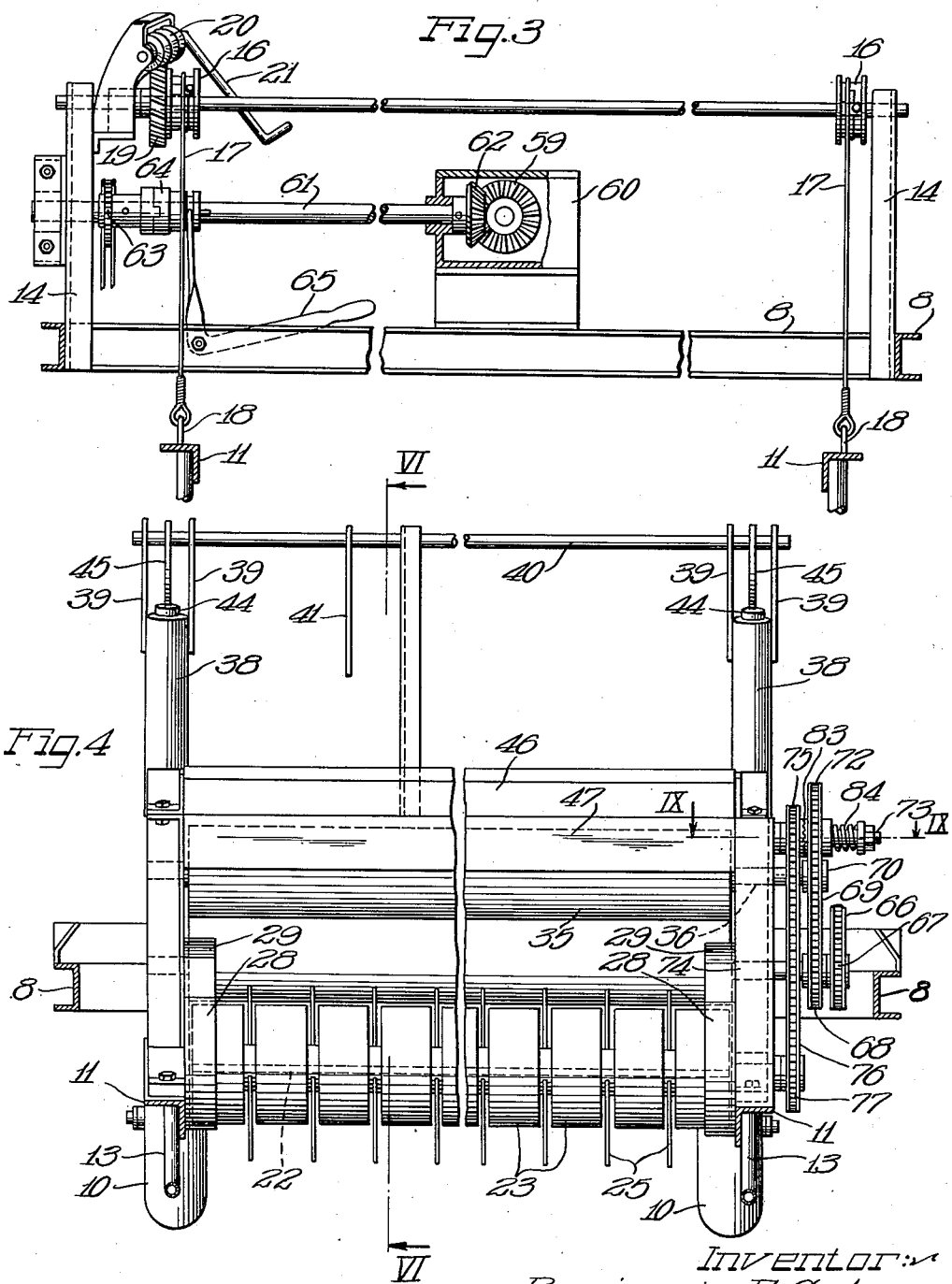

April 8, 1952 B. E. GETZ 2,592,270
METHOD OF PROCESSING HAY AND THE LIKE
Original Filed July 26, 1949 5 Sheets-Sheet 4

Inventor:
Benjamin E. Getz
by Hill, Sherman, Meroni, Gross & Simpson Attys

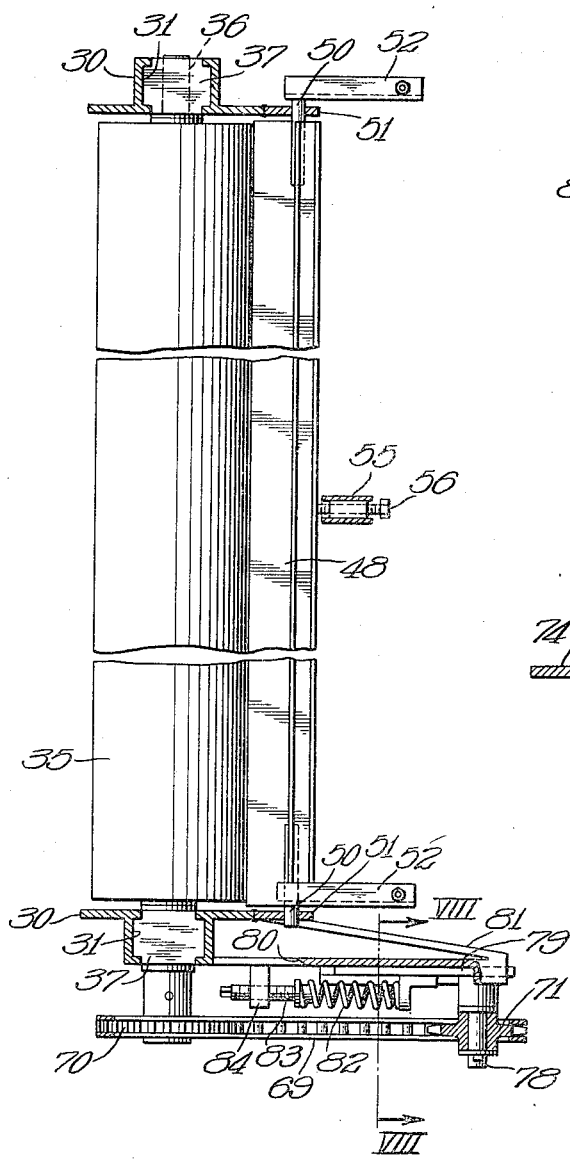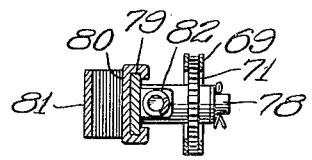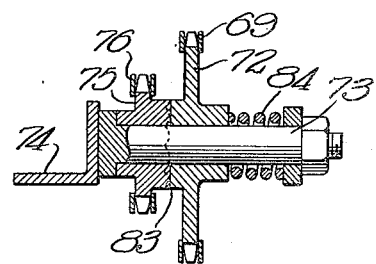

Patented Apr. 8, 1952

2,592,270

UNITED STATES PATENT OFFICE 2,592,270

METHOD OF PROCESSING HAY AND THE LIKE

Benjamin E. Getz, Morton, Ill., assignor to A. F. Meyer Mfg. Co., Morton, Ill., a corporation of Illinois Original application July 26, 1949, Serial No. 106,864. Divided and this application November 8, 1951, Serial No. 255,487

2 Claims. (Cl. 56—1)

This invention relates to improvements in a method of processing hay and the like, and is highly desirable for use in connection with the processing or conditioning of hay and similar crop requiring natural drying in the field, although the invention may have other uses and purposes as will be apparent to one skilled in the art.

The instant application is a division of my copending application entitled "Agricultural Cutting and Processing Machine Assembly," filed July 26, 1949, Serial No. 106,864.

In order to facilitate harvesting, add to the economy of harvesting and storing, and avoid the risk of loss due to inclement weather, it has become desirable in connection with hay and similar crop requiring natural drying in the field, to cut the hay, and thereafter crush the hay between a pair of rollers, and then distribute it loosely upon the ground for drying. The crushing preserves the natural color of the hay, preserves the nutriment value therein to a greater extent than otherwise, and materially hastens the time of drying. Heretofore, the methods employed for this purpose were such in practice that the tractor or other power vehicle ran over a processed swath of hay and pressed a goodly portion of the processed hay down into the stubble, frequently requiring an additional tedding operation, and in any event rendering the hay non-uniform in character and requiring a greater drying time for the parts the tractor ran over.

With the foregoing in mind, it is an important object of the instant invention to provide a method of crushing or processing hay or similar crops naturally dried in the field, which includes the steps of crushing and lightly redistributing a mowed swath, while mowing the next adjacent swath, whereby the tractor may pass over a mowed swath, but never over a processed swath.

It is also an object of this invention to provide a method of processing hay and the like, which includes the steps of mowing a swath, and simultaneously processing the mowed crop in the next adjacent mowed swath by picking up that crop, crushing the same to fracture the stems thereof, and then redistributing and spreading the crop on the ground in a loose fluffy condition for quick drying, behind the tractor or other power vehicle and behind the mechanism used for the crushing operation.

Still another object of the instant invention is the provision of a new and novel method of processing hay and the like, whereby the hay may be cut, crushed, and redistributed in the field for drying without anything passing over the redistributed or processed hay.

Still another object of this invention is the provision of a method of processing hay and the like, including the steps of acting upon a plurality of swaths in the field at substantially the same time, namely, cutting one swath while processing the next adjacent swath.

While some of the more salient features, characteristics and advantages of the instant invention are pointed out, others will become apparent from the following disclosures, taken in conjunction with the accompanying drawings, in which:

Figure 2 is an enlarged fragmentary side elevational view of the processing apparatus of Fig. 1;

Figure 3 is a fragmentary transverse vertical sectional view, with parts broken away, taken substantially as indicated by the line III—III of Fig. 2, looking in the direction of the arrows;

Figure 4 is also a fragmentary transverse vertical sectional view taken substantially as indicated by the line IV—IV of Fig. 2;

Figure 7 is a fragmentary plan sectional view taken substantially as indicated by the line VII—VII of Fig. 6;

Figure 8 is a transverse vertical sectional view taken substantially as indicated by the line VIII—VIII of Fig. 7, illustrating a structural detail, namely the mounting of the tension sprocket in the drive arrangement; and Figure 9 is an enlarged fragmentary plan sectional view taken substantially as indicated by the line IX—IX of Fig. 4.

As shown on the drawings:

Briefly, the instant method embodies the step of mowing a swath of hay or similar crop and while so doing processing the next adjacent or just previously mowed swath. The processing operation consists in picking up the mowed hay by suitable means such as a rotary rake, and passing it between a pair of crushing rolls, after which the hay is again distributed upon the ground in a loose fluffy condition and in an even manner for drying in the field. By so processing a swath of hay that has been already mowed, next adjacent the swath then being mowed, not only is a proper time interval between the cutting and the processing maintained, but more important, it is impossible for any farm vehicle to pass over a processed swath of hay and adversely affect a goodly portion of it.

As an example of how the method may actually be practiced in the field, and as an example of at least one form of equipment capable of performing the method, the accompanying drawings and following description are included herein.

Figure 1:
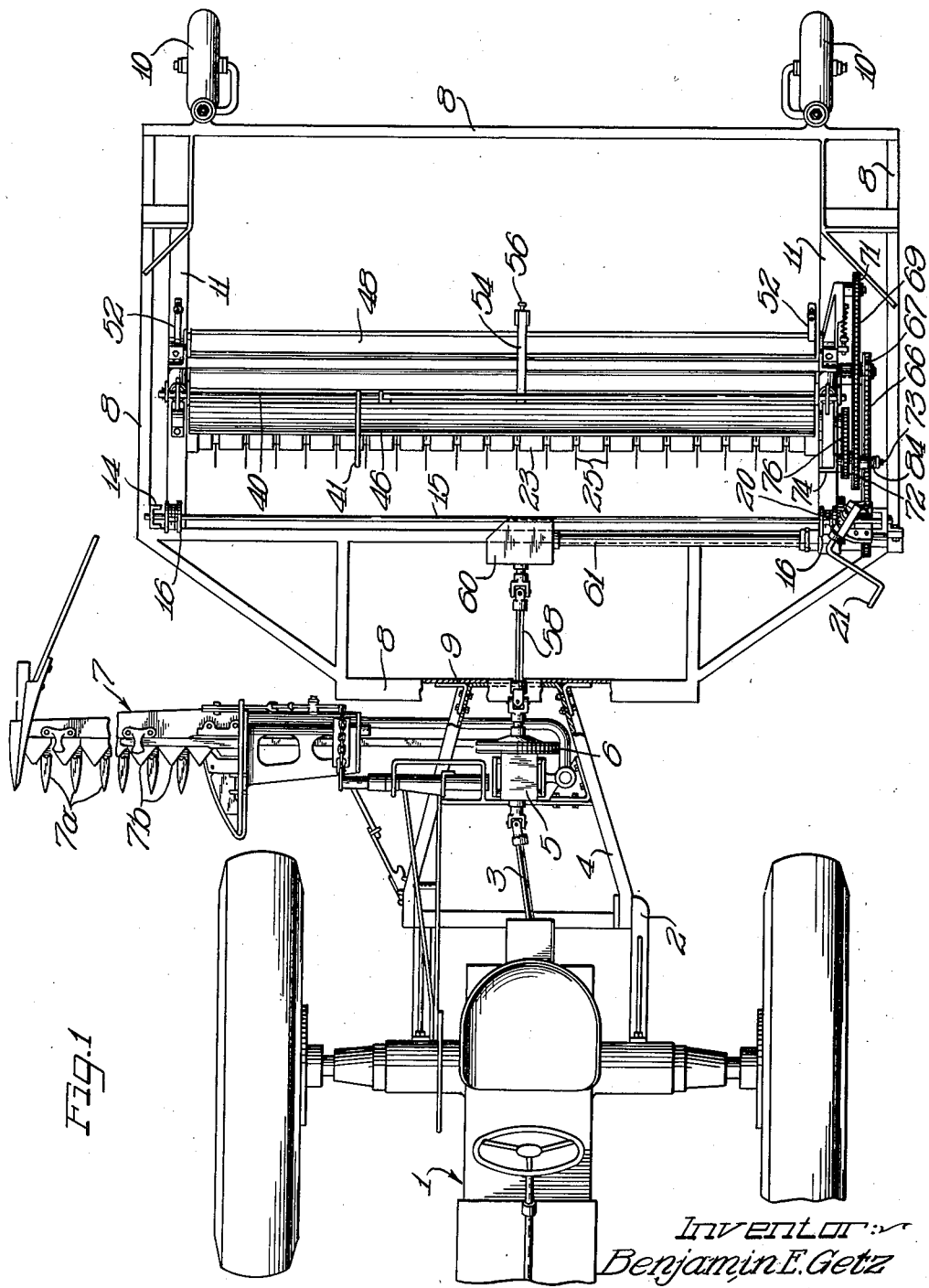
Figure 1 is a fragmentary plan view of a power vehicle in the form of a tractor to which is connected as a unit mowing means and processing apparatus embodying principles of the instant invention.
Figure 5:
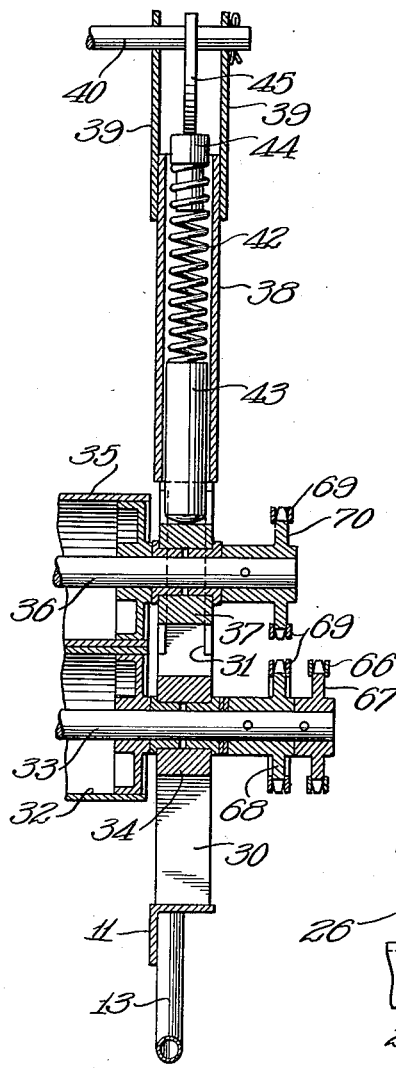
Figure 5 is an enlarged fragmentary vertical sectional view taken substantially as indicated by the line V—V of Fig. 2, illustrating the mounting of the rolls in the processing apparatus.

With reference to Fig. 1, it will be seen that an illustrated embodiment of one form of apparatus capable of performing the instant method is shown in operative association with a power vehicle in the form of a tractor generally indicated by numeral 1. This tractor is provided with the usual draw bar arrangement 2 and a power takeoff visually exemplified by a telescopic shaft and universal joint assembly 3.

Pivotally connected to the drawbar arrangement 2, for up and down relative movement, is the frame 4 of a mowing or cutting mechanism, which is of known construction, and embodies a gear box 5 and drive wheel 6 connected to the shaft assembly 3 to be driven from the tractor takeoff. A cutter bar assembly generally indicated by numeral 7 extends laterally to one side of the tractor and includes the usual guard members 7a with which reciprocating knife blades 7b are associated, the reciprocation of which is effected by an eccentric connection with the drive wheel 6. In this assembly, a cutter bar assembly floats independently of the tractor, to one side thereof, and is especially suitable for cutting over uneven ground.

Previously, where such a mowing arrangement has been connected to a tractor, it has been usual to employ a caster wheel mounting at the rear end of the frame 4. That was because the mower was all that was connected to the tractor, and a rear rotary support was deemed desirable.

In the present instance, however, where processing apparatus is integrally joined with the mower, the frame 4 has been foreshortened, the caster wheel eliminated, and the forward part of a main frame 8 for the processing apparatus is welded, bolted, or equivalently secured directly to the foreshortened frame 4 of the cutting mechanism as indicated at 9 in Fig. 1. Thus processing apparatus and the cutting mechanism are joined together to all intents and purposes as an integral unit and may be treated as a unit when connecting and disconnecting the entire cutting and processing assembly to and from the tractor by virtue of the combined drawbar structure. It will be understood that the main frame 8 is formed of various channel and angle irons welded or equivalently secured together at meeting points, and it is not necessary herein to enter into a specific description of the details of construction of such frame.

The rear end of the main frame 8 of the processing apparatus is preferably supported on each side thereof with a trailing caster wheel 10, as clearly seen in Figs. 1, 2, and 4.

With reference more particularly to Figs. 1, 2 and 3, it will be seen that the main frame 8 carries an underslung subframe 11 which is pivotally connected at each side of the rear end thereof to the subframe as indicated at 12 in Fig. 2. The side rails of this subframe 11 normally slope forwardly and downwardly, and each of these side rails is preferably provided with a ground skid 13 in the form of a U-shape pipe or the equivalent and which ground skids prevent dropping the subframe too great a distance, and which effectively support the subframe in operative position when it is lowered to its maximum extent.

Elevating adjustment means are provided for the subframe 11 and these means, of course, are carried by the main frame 8. As seen best in Figs. 2 and 3, a pair of uprights 14—14 are secured to the main frame 8 and at their upper ends support a cross shaft 15. At each end thereof this shaft carries a pulley 16 to which one end of a cable 17 is fixed, the other end of the cable being connected to an eye on the front end of the subframe 11 as indicated at 18. Near one end thereof the shaft 15 also carries a worm wheel 19 fixed to the shaft and in mesh with a drive worm 20 actuated by a manually operable handle 21 which may be locked in a suitable position of adjustment by any desirable means. The operator need simply rotate the handle 21 in the proper direction to either elevate or lower the subframe 11 when desired.

Figure 6:
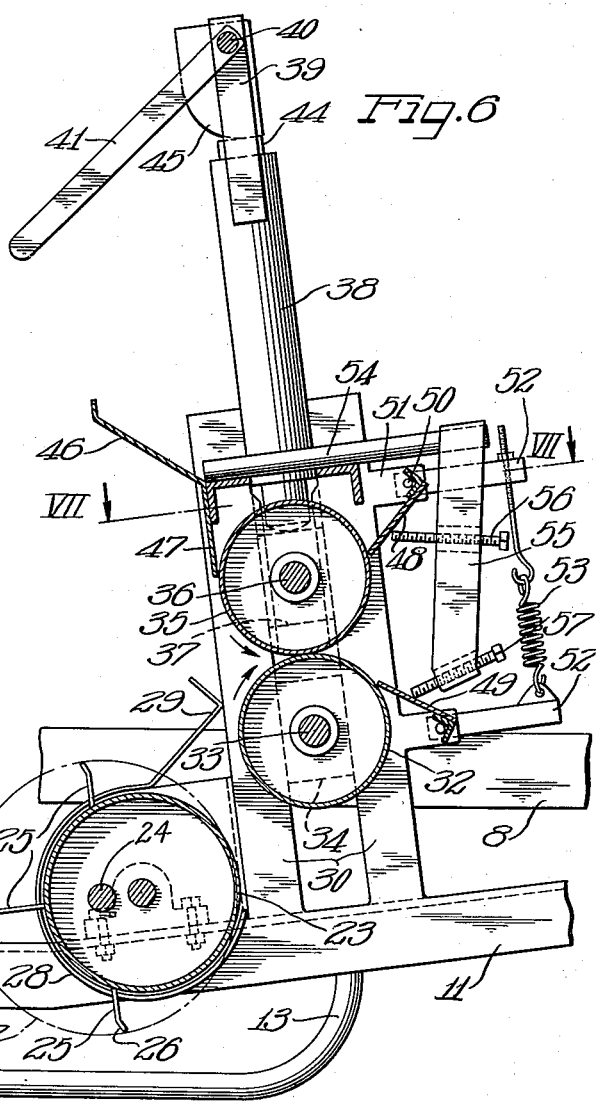
Figure 6 is an enlarged fragmentary vertical sectional view taken longitudinally of the processing apparatus substantially as indicated by the line VI—VI of Fig. 4.

Hay elevating means designed to pick up mowed hay from the ground are also carried by the subframe 11. These means which are only diagrammatically illustrated herein are preferably in the form of a rotary rake as best seen in Figs. 2, 4 and 6. These means are of the same construction set forth in George Innes U. S. Letters Patent No. 2,133,143, issued October 11, 1938. Journaled in suitable bearing blocks on the subframe 11 is a cross shaft 22. This shaft carries a plurality of spaced hollow drum segments 23. A second cross shaft 24 (Fig. 6) extends parallel to shaft 22 and extends through these drum segments, but is eccentrically disposed in relation to the drum segments. This second shaft 24 is driven in any suitable manner from the shaft 22 and carries a series of spaced rake elements each of which comprises a plurality of spaced tines 25, each tine preferably having the end portion thereof turned rearwardly as indicated at 26 in Fig. 6. Each set of tines 25 is disposed in the space between adjacent drum segments as clearly seen in Figs. 1 and 4. Owing to the eccentric disposition of the rake or tine shaft 24, the tines 25 will operate through a circle of operation indicated by numeral 27 in Fig. 6. Thus, each tine 25 will project outwardly from the surface of the drum segments 23 variable distances during each revolution, the tine being substantially flush with the drum surfaces when extending rearwardly, gradually increasing to a maximum extent through the forward 180° of rotation, and then gradually decreasing to the minimum extent through the next 180° of rotation. Therefore, as each tine engages mowed hay upon the ground, it will first engage that hay with a lesser extent beyond the drum surfaces, and gradually increases its extent from those surfaces to better grip the hay as the tine moves upwardly and forwardly so as to insure adequate elevation of the hay. After the tine passes the midpoint where it is at its greatest extent, it gradually recedes into the drum surfaces in order to effect a quick and positive release of the hay so picked up. In the illustrated instance there are four equally spaced tines shown upon each rake element, but it will be understood that the number of tines may be varied depending upon the exigencies of circumstances.

Adjacent each end of the rotary rake structure, is a semi-circular guard 28 terminating at its upper end in a rearwardly sloping and forwardly bent portion 29, the function of these guards being to prevent hay being thrown or dropped between the frame and the end drum segments and immediately adjacent the bearings for the shaft 22.

Hay picked or thrown upwardly by the action of the rotary rake structure just above described, is delivered by that structure to crushing means now about to be described. With reference more particularly to Figs. 2, 5, 6 and 7, it will be seen that a pair of frame members 30 extends generally upwardly from each side of the subframe 11. These members are so arranged as to define an open channel 31 therebetween as clearly seen in Fig. 7. These channels 31—31 accommodate bearings for the shafts of crushing rolls. In the illustrated instance two such rolls are shown, including a lower roll 32 carried on a shaft 33 journaled in fixed bearings 34—34, these bearings being locked in position in the respective channels 31—31. An upper roll 35 is carried on a shaft 36 which is journaled in floating bearings 37—37, which bearings may move up and down within the channels 31—31.

The upper roll 35 is preferably resiliently urged to contact with the lower roll 32. The means for applying pressure to this upper roll are illustrated more clearly in Figs. 2, 4, 5 and 6. These means include a cylinder 38 fixedly carried on the upper end of each upstanding frame assembly 30. Each cylinder 38 is provided with a pair of upwardly projecting members 39—39, which members journal a cross shaft 40 that may be manually oscillated by means of a hand lever 41. In each cylinder 38 is a compression spring 42, the lower end of which bears against a plunger 43 contacting the respective bearing 37. The upper end of the spring is secured to a plunger type rider 44 in engagement with a cam 45 fixed to the shaft 40. It will therefore be apparent that when a load is passed between the crusher rolls 36 and 32 variations in the loads are compensated for by a slight up and down movement of the upper roll 36 against the action of the springs 42—42. In the event a sudden overload or jamming occurs, it is a simple expedient for the operator to move the handle 41, actuate the cam 45—45 and release the pressure on the upper roll sufficient to clear any jamming or sudden overload. A movement of the handle in the opposite direction, of course, restores the pressure upon the upper roll.

In order to prevent hay being thrown above the set of crushing rolls by the rotary rake above described, a baffle or deflector 46 (Figs. 2, 4 and 6) projects forwardly and upwardly from the cross members on the roll frame 30, and this member has a skirt 47 extending downwardly substantially into contact with the upper roll 36 so as to prevent material being tossed over the upper surface of this roll.

On the rearward side of the crusher rolls scraper means are provided to maintain the rolls in a clean condition and prevent long strands of hay or other material from winding around the rolls. These means include an upper scraper blade 48 and a lower scraper blade 49 for the rolls 36 and 32, respectively, the blades extending entirely across the apparatus and contacting the respective rolls. Each blade is secured to an angle iron to which a shaft 50 is welded or equivalently secured, the shaft being journaled in lugs 51—51 projecting from the sides of the upstanding frame members 30—30. On the outer ends of the shaft links 52—52 are connected, and the links for the upper shaft are connected to the links for the lower shaft immediately therebelow by means of a tension spring 53 designed to draw the upper and lower links toward each other, thereby resiliently urging the scrapers against the respective rolls. Owing to the length of the scraper blades 48 and 49, it may be beneficial to provide a reinforcement for the blades in the central portion thereof. To this end, a rearwardly projecting bar 54 is welded or equivalently secured to the cross members between the frame parts 30—30, substantially centrally of the structure, and depending from this bar, a bracket or bolt carrier 55. As seen best in Fig. 6, a bolt 56 may pass through the bracket 55 into contact with a center portion of the scraper blade 48, and a bolt 57 may likewise contact the scraper blade 49, thus stabilizing the central portion of these blades.

The drive for the processing apparatus is best seen in Figs. 1, 2, 3 and 4, with certain structural details shown in other figures referred to later. The shaft for the aforesaid drive wheel 6 operating the mowing means extends through that wheel and is connected by a suitable telescopic shaft and universal joint assembly 58 to a bevel gear 59 and a gear box 60 mounted on the main frame. Journaled in one of the upstanding frame elements 14 and the gear box itself is a shaft 61 which carries on its inner end a bevel gear 62 receiving its drive from the aforesaid gear 59. On the outer end thereof this shaft 61 carries a drive sprocket 63 and a suitable clutch 64 manually controlled by a lever 65 establishes power engagement for the operation of the drive sprocket 63.

When the clutch is engaged, the sprocket 63 through a chain 66 drives a sprocket 67 on the shaft 33 of the lower crusher roll. As seen clearly in Fig. 4, this shaft 33 carries another sprocket 68 adjacent the sprocket 67 around which a tortuously disposed chain 69 is entrained. As seen in Fig. 2, the chain 69 passes in the reverse direction around a sprocket 70 on the shaft 36 of the upper crusher roll, then extends rearwardly around a tensioning sprocket 71, and then forwardly around a sprocket 72 on a stub shaft 73 journaled in an upstanding support 74 secured to the subframe 11 on one side thereof. From the sprocket 72, the chain 69 again encircles the aforesaid sprocket 68 on the lower roll shaft. The stub shaft 73 also carries an inner sprocket 75 which by way of a chain 76 drives a sprocket 77 secured to the shaft 22 of the rotary rake structure above described so as to drive the latter.

With reference now more particularly to Figs. 7 and 8, it will be noted that tension is maintained upon the roll driving chain 69 by a suitable mounting arrangement for the sprocket 71. This sprocket 71 is carried on a stub shaft 78 the journal of which is mounted on a slide member 79 which may slide backwardly and forwardly inside a channel formation 80 carried on an arm 81 projecting from the adjacent upstanding frame part 30. A compression spring 82 disposed between the slide 79 and a bolt 83 adjustably mounted in a lug 84 projecting from the arm 81 normally urges the slide 79 and sprocket 71 rearwardly to maintain the chain 69 in a taut condition. Now with reference again to Fig. 2, it will be noted that as the upper roll may move upwardly and downwardly both against and with the action of the pressure spring 42—42, the sprocket 70 pulls upon and yields to the chain 69, causing the sprocket 71 to move inwardly and outwardly against the action of the compression spring 82, proper tension being maintained at all times by that compression spring 82.

Looking now at Figs. 4 and 9, it will be noted that safety means are provided to prevent injury to the drive mechanism and other apparatus in the event the rotary rake structure strikes a rock or some other substantially unyieldable object in the ground. To this end, it will be noted that the sprocket 72 which transfers the drive to the stub shaft 73 is loosely disposed upon the shaft 73 and is urged into engagement with a slip clutch connection 83 carried in part with the sprocket 72 and in part by the sprocket 75, by means of a compression spring 84. As before stated, the sprocket 75 through its chain 76 drives the rotary rake assembly. Consequently, should that rotary rake strike an immovable object, the rotation of the rake is stopped, and rather than any injury occur to any part of the apparatus, the clutch arrangement 83 will merely slip against the action of the spring 84.

The practice of the instant invention with the apparatus above described is highly efficient, rapid, and economical. No more trouble is experienced in operating the mowing and processing assembly than would be experienced in operating a mower alone. It will be noted from the showing in Fig. 1, that the processing means follow directly behind the tractor 1 while the cutter bar extends laterally to one side thereof, so that the tractor and processing means travel down a mowed swath while the cutting means are mowing the next adjacent swath.

While the next swath is being mowed, the rotary rake assembly above described picks up the mowed hay in the previously cut swath behind the tractor and elevates and throws that picked up hay between the crusher rolls 35 and 32. These crusher rolls crush the stems or stalks of the hay, and as it passes between the rolls, the crushed hay is permitted to fall loosely and lightly upon the ground behind the processing apparatus. The crushing of the stems or stalks of the hay enables the hay to be dried in a considerably shorter time than usual, and the loose and free disposition of the crushed hay also aids in shortening the drying time, since the hay is distributed substantially the way it would be if acted upon by a tedding machine. In most cases, with the use of the present apparatus the hay will naturally dry upon the ground in substantially half the time heretofore necessary. It will be noted especially that after the passage of the machine, none of the hay is left compacted or pressed against the ground by virtue of heavy wheels traveling thereover. After processing, the hay is left loosely upon the ground in a fluffed condition where it may easily be raked up when dry.

It will be noted that the instant method may be practiced very economically, and is highly effective in the satisfactory processing of hay and similar crops, and it will be understood that modifications and variations may be effected in the steps of the method, without departing from the scope of the novel concept of the instant invention.

I claim as my invention:

1. The method of processing hay and similar crops naturally dried in the field, including the steps of crushing and lightly redistributing a mowed swath while mowing the next adjacent swath.

2. The method of harvesting hay and similar crop to be naturally dried on the ground, including the steps of mowing a swath, and simultaneously processing the mowed crop in the next adjacent swath by picking up the mowed crop, crushing the same to fracture the stems thereof, and then redistributing and spreading the crop on the ground in a loose, fluffy condition for quick drying.

BENJAMIN E. GETZ.

No references cited.